Jan. 12, 1954     C. E. SMITH     2,665,611
MIRROR SUPPORTING MOUNT AND SECURING MEANS
Filed June 21, 1950

INVENTOR.
CLARENCE E. SMITH
BY
ATTORNEY

Patented Jan. 12, 1954

2,665,611

UNITED STATES PATENT OFFICE 2,665,611

MIRROR SUPPORTING MOUNT AND SECURING MEANS

Clarence E. Smith, Rochester, N. Y., assignor to Graflex, Inc., Rochester, N. Y., a corporation of Delaware Application December 21, 1950, Serial No. 201,945

3 Claims. (Cl. 88—96)

The present invention relates to mirror retainers and supports and more particularly to means for supporting and securing in position a mirror or reflector of a coupled rangefinder for a photographic camera.

In coupled rangefinders for photographic cameras there are two windows, a relatively fixed mirror or reflector in register with one of the windows, a movable mirror or reflector in register with the other window, one of the mirrors or reflectors being semi-transparent, and an observation window or eye-piece in register with the semi-transparent reflector or mirror. The user, upon looking into the eye-piece, sees two images of the object to be photographed, one reflected from one mirror and the rear face of the semi-transparent mirror, and the other visible directly through the semi-transparent mirror. By adjusting the objective lens of the camera forward or back these two images may be brought together, and when this is done the camera is in proper focus.

In conventional rangefinders the mirrors or reflectors are cemented to their supports or backings. Cementing is a messy job and not entirely satisfactory. Moreover, any strains in the support or backing are transmitted to the mirror or reflector.

One object of the present invention is to provide means for securing a mirror or reflector to its support without requiring cementing of the mirror or reflector to the support.

Another object of the invention is to provide means for securing a mirror or reflector to a support which can readily and quickly be applied or removed, thus permitting quick attachment to or removal of the mirror or reflector from its support.

A further object of the invention is to provide a mirror mounting in which strains in the support or mounting will not be transmitted to the mirror.

Still another object of the invention is to provide a mirror mounting or support by means of which the mirror will be held with a three-point bearing on its support to avoid any strain due to a non-planar support.

Other objects of the invention will be apparent hereinafter from the specification and from the recital of the appended claims.

The invention has been illustrated as applied to a mounting for one of the mirrors or reflectors of the rangefinder disclosed in the pending U. S. patent application of the present inventor, Hubert Nerwin, and Milford B. Moore, Serial No. 200,414 filed December 12, 1950. The invention is capable of use, however, in the mounting of mirrors in any type of photographic rangefinder, and, in fact, is generally applicable to mirror mountings, and to mountings for optical components where strain-free mounting is required.

Figure 1:
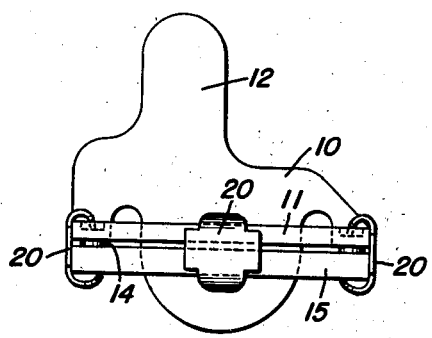
Fig. 1 is a plan view showing the invention applied in the mounting of one of the mirrors of the rangefinder of U. S. patent application Serial No. 200,414 above mentioned.
Figure 2:
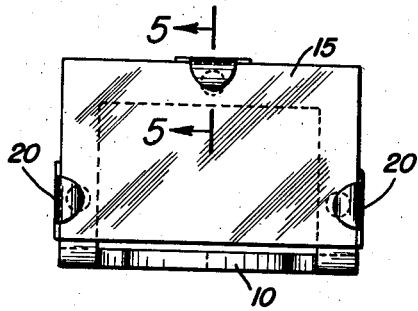
Figs. 2, 3 and 4 are a front elevation, a rear elevation, and a side elevation, respectively, of the mirror and its mounting.
Figure 3:
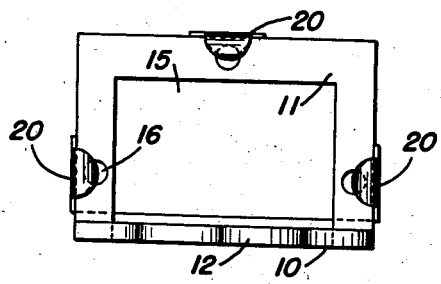
Figure 4:
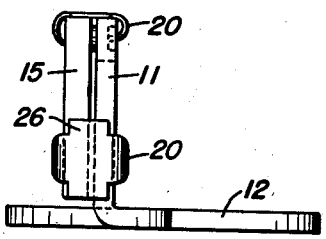
Figure 5:
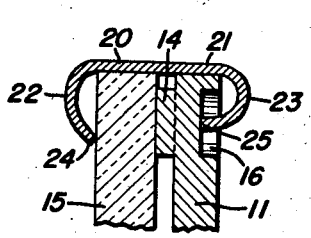
Fig. 5 is a fragmentary section on the line 5—5 of Fig. 2 on an enlarged scale.
Figure 6:
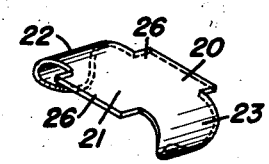
Fig. 6 is a perspective view on an enlarged scale of one of the spring clips or retainers for the mirror.
Figure 7:
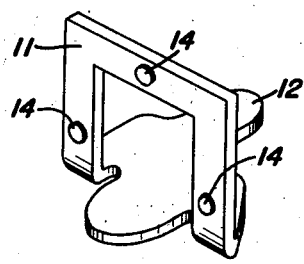
Fig. 7 is a perspective view of the mirror mounting looking at the front of the same.

What is specifically shown in the drawing of the present application is the mounting for the semi-transparent mirror of the rangefinder of the patent application above mentioned. This mounting comprises a metallic stamping 10 having an upwardly bent frame portion 11 and a rearwardly extending tail portion 12. The frame portion is coined at three spaced points to form three spaced forwardly projecting seating bosses 14 on its front face and three corresponding aligned recesses 16 in its rear face (Fig. 5).

The mirror or reflector 15 is secured to the frame 11 of the support by three spring clips 20. These spring clips are identical with one another. Each clip 20 comprises a body portion 21 and two inwardly turned end portions 22 and 23 which are bent so that the free ends 24 and 25 thereof lie approximately parallel to the body portion 21. The spring clips are adapted to be engaged over the contiguous edge surfaces of the mirror 15 and frame portion 11 of support 10 with the end of one leg of each clip engaging the front face of the mirror and the end of the other leg of each clip seating in one of the recesses 16 formed in the back of the frame 11. The mirror or reflector is thus supported with a three point bearing on the frame 11. Moreover, the spring clips 20 apply pressure for holding the mirror on the support in line with the three seats or bosses 14. A mounting is thereby provided for the mirror which will not transmit strains in the support to the mirror. At the same time, a mounting is provided which permits the mirror to be easily assembled on or disassembled from its support.

No cementing of the mirror to the support is required; and the mess and cost of this operation are obviated. The three-point bearing provided by bosses 14, moreover, establishes the plane of the mirror.

The spring clips are formed with lateral wings or projections 26 at opposite sides of the body portion. These have no function, however, in the use of the spring clips but are provided simply for expediency in manufacture of the blanks from which the spring clips are stamped.

While the invention has been illustrated in connection with the mounting of a semi-transparent mirror, it will be understood that it is as previously stated applicable to any mirror or reflector mounting. Furthermore, while the invention has been described in connection with a specific embodiment thereof it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In combination, a mirror, and a support therefor, said support having three spaced bosses integral therewith and projecting from one face thereof, said bosses having front seating faces lying in a common plane to provide a three-point bearing against which the adjacent face of the mirror is adapted to seat, said support having three recesses formed in its opposite face in line with said bosses, and three removable spring clips, each adapted to extend over adjacent edges of the mirror and support and each having its opposite ends bearing respectively against the distal faces of the mirror and support, the end of each spring clip which engages against the support seating in one of said recesses of the support and the opposite end of each spring clip engaging the mirror at a point in line with a boss and recess, whereby each spring clip applies pressure resiliently on the mirror in line with a boss and the three spring clips together hold the mirror resiliently on the support.

2. A mounting for a mirror, comprising a support having front and rear faces and three spaced bosses which are integral with the support and which project forwardly from the front face of the support, said bosses having front faces which lie in a common plane and which provide a three-point bearing against which the rear face of the mirror is adapted to seat, and three separate, removable spring clips, each clip having a body portion and opposed inwardly inturned ends, the body portion of each clip extending over the contiguous edge surfaces of the mirror and support and the two inturned ends of each clip engaging, respectively, the front face of the mirror and the rear face of the support in line with one of said bosses to apply a resilient holding pressure to the mirror in line with each boss to hold the mirror on said support.

3. A mounting for a mirror, comprising a support consisting of a metallic stamping which is coined at three spaced points to form three integral, spaced bosses which project forwardly from its front face and three corresponding aligned recesses in its rear face, said bosses having front faces against which the mirror is adapted to seat which lies in a common plane, and three removable spring clips, each clip having a body portion and opposed inwardly inturned ends, the body portion of each clip extending over the contiguous edge surfaces of the mirror and support, and the two inturned ends of each clip engaging, respectively, in a recess in the stamping and against the front face of the mirror in line with said recess, whereby each spring clip applies pressure on the mirror in line with a boss and the three spring clips together hold the mirror resiliently on the stamping.

CLARENCE E. SMITH.

References Cited in the file of this patent

UNITED STATES PATENTS

| Number | Name | Date |
|---|---|---|
| 536,493 | Wadsworth | Mar. 26, 1895 |
| 1,281,926 | Fecker | Oct. 15, 1918 |
| 1,724,029 | La Hodny | Aug. 13, 1929 |
| 2,129,189 | Alder | Sept. 6, 1938 |
| 2,306,023 | Lumley | Dec. 22, 1942 |
| 2,392,428 | Swift | Jan. 8, 1946 |
| 2,403,737 | Mihalyi | July 9, 1946 |
| 2,487,875 | Hutchison | Nov. 15, 1949 |

FOREIGN PATENTS

| Number | Country | Date |
|---|---|---|
| 13,562 | Great Britain | June 12, 1907 |